UNITED STATES PATENT OFFICE.

MONTRAVILLE GERNSEY, OF MIDDLEBURG, NEW YORK.

IMPROVEMENT IN FIRE-KINDLERS.

Specification forming part of Letters Patent No. 135,706, dated February 11, 1873.

*To all whom it may concern:*

Be it known that I, MONTRAVILLE GERNSEY, of Middleburg, in the county of Schoharie and State of New York, have invented a new and useful Improvement in Fire-Kindlings, of which the following is a specification:

My invention has for its object to furnish an improved kindling for starting coal or wood fires in stoves, grates, furnaces, heaters, &c., easily prepared, inexpensive, and reliable and effective in use; and it consists in an improved fire-kindling, formed by immersing ordinary charcoal in a saturated solution of chlorate of potash and nitrate of potassa in water, and, when dried, in a saturated solution of resin in petroleum oil, as hereinafter more fully described.

In preparing my improved kindling, I take any desired quantity of ordinary charcoal and immerse it for thirty minutes, more or less, in a saturated solution of chlorate of potash and nitrate of potassa, dissolved, in the proportion of one pound of the chlorate to two pounds of the nitrate, in water, at a temperature of from about 75° to 85° Fahrenheit. The charcoal is then dried in any convenient manner. The charcoal thus prepared is then immersed in a saturated solution of resin in ordinary petroleum oil, for from twenty to thirty-five minutes, according as the solution is hotter or colder. This solution is prepared by heating the petroleum to a temperature of from 180° to 200° Fahrenheit, and putting into it resin until no more will be dissolved. The charcoal may be immersed in the solution while hot or after it has become cold, as may be convenient. The charcoal is then dried in any convenient manner until the petroleum is evaporated. The petroleum dissolves or cuts the resin and carries it into the pores of the charcoal, where it is left when the petroleum evaporates. The resin is readily set on fire by a match or piece of lighted paper, and the heat thus produced decomposes the chlorate and nitrate, and sets free large quantities of oxygen to support combustion, thus producing an intense heat, kindling the coal or wood fuel quickly and effectually.

Having thus described my invention, I claim as new and desire to secure by Letters Patent—

A fire-kindler prepared by immersing solid charcoal in water saturated with one part of chlorate and two parts of nitrate of potash, and then, after drying, in oil saturated with resin, as and for the purpose described.

MONTRAVILLE GERNSEY.

Witnesses:
JAMES T. GRAHAM,
T. B. MOSHER.